(12) United States Patent
Gheorghiu et al.

(10) Patent No.: US 8,897,266 B2
(45) Date of Patent: Nov. 25, 2014

(54) METHOD AND APPARATUS FOR TRANSMITTING CONTROL INFORMATION VIA UPPER LAYER

(75) Inventors: Valentin Alexandru Gheorghiu, Tokyo (JP); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 950 days.

(21) Appl. No.: 12/729,765

(22) Filed: Mar. 23, 2010

(65) Prior Publication Data

US 2010/0246518 A1 Sep. 30, 2010

Related U.S. Application Data

(60) Provisional application No. 61/164,123, filed on Mar. 27, 2009.

(51) Int. Cl.
| | |
|---|---|
| H04W 72/04 | (2009.01) |
| H04L 1/00 | (2006.01) |
| H04L 1/16 | (2006.01) |
| H04W 80/02 | (2009.01) |
| H04L 1/18 | (2006.01) |
| H04L 29/08 | (2006.01) |
| H04L 5/00 | (2006.01) |

(52) U.S. Cl.
CPC .............. *H04W 80/02* (2013.01); *H04L 1/0028* (2013.01); *H04L 1/0073* (2013.01); *H04W 72/0406* (2013.01); *H04L 1/1607* (2013.01); *H04L 1/1861* (2013.01); *H04L 69/32* (2013.01); *H04L 5/0053* (2013.01)
USPC .......................................................... 370/332

(58) Field of Classification Search
USPC .......................................................... 370/335
See application file for complete search history.

(56) References Cited

U.S. PATENT DOCUMENTS

| | | | | |
|---|---|---|---|---|
| 2002/0065081 | A1* | 5/2002 | Barany et al. | 455/450 |
| 2006/0077923 | A1* | 4/2006 | Niwano | 370/328 |
| 2009/0010203 | A1* | 1/2009 | Pratt et al. | 370/328 |
| 2009/0316811 | A1* | 12/2009 | Maeda et al. | 375/260 |
| 2009/0327703 | A1* | 12/2009 | Feudo et al. | 713/156 |

FOREIGN PATENT DOCUMENTS

| | | |
|---|---|---|
| EP | 1641298 | 3/2006 |
| WO | WO2006104344 | 10/2006 |

OTHER PUBLICATIONS

International Search Report and Written Opinion—PCT/US2010/028550, International Search Authority—European Paten Office—Nov. 10, 2010.
Mitra N et al: "Relationship of the Signaling System No. 7 Protocol Architecture to the OSI Reference Model" IEEE Network, IEEE Service Center, New York, NY, US LNKD-DO1 : 10.1109/65.67857, vol. 5, No. 1, Jan. 1, 1991 p. 26,29,37, XP000178244 ISSN : 0890-8044.

* cited by examiner

*Primary Examiner* — Huy D Vu
*Assistant Examiner* — Teisha D Hall
(74) *Attorney, Agent, or Firm* — François A. Pelaez

(57) ABSTRACT

Techniques for supporting communication for wireless devices in a wireless network are described. The wireless network may support transmission of control information on a first physical channel having a first minimum SNR for reliable reception. Some wireless devices may require operation at a lower SNR. In an aspect, low SNR operation may be supported by transmitting control information for a lower layer (e.g., Layer 1 or 2) in a protocol stack via an upper layer (e.g., Layer 3) in the protocol stack. This transmission scheme may allow the control information to be transmitted on a second physical channel instead of the first physical channel normally used to transmit the control information. The second physical channel may have a lower minimum SNR than the first minimum SNR. This transmission scheme may also allow the control information to be transmitted multiple times to improve reliability.

36 Claims, 8 Drawing Sheets

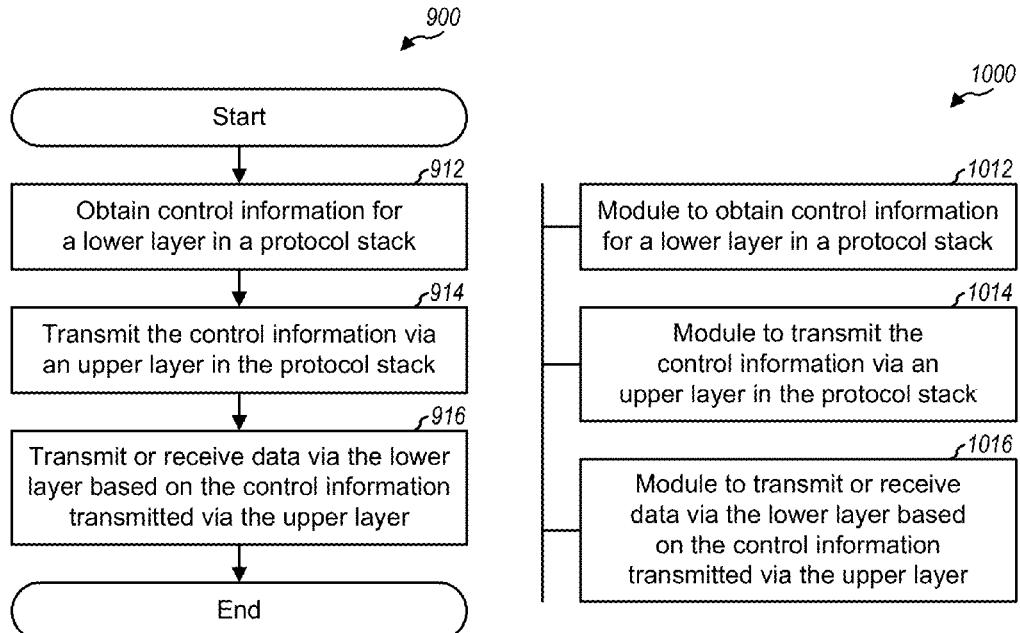
FIG. 9
FIG. 10
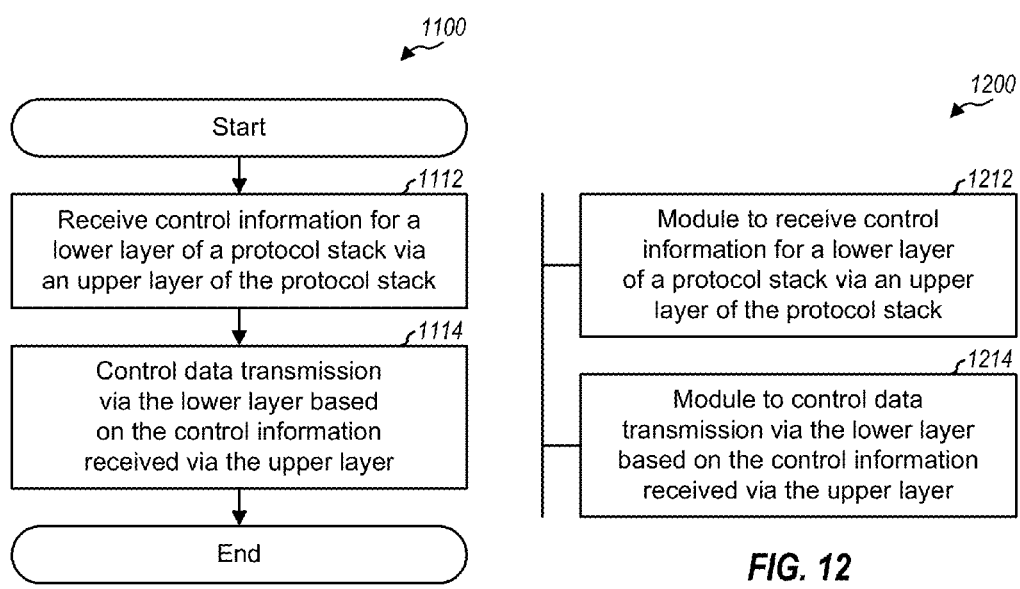
FIG. 11
FIG. 12

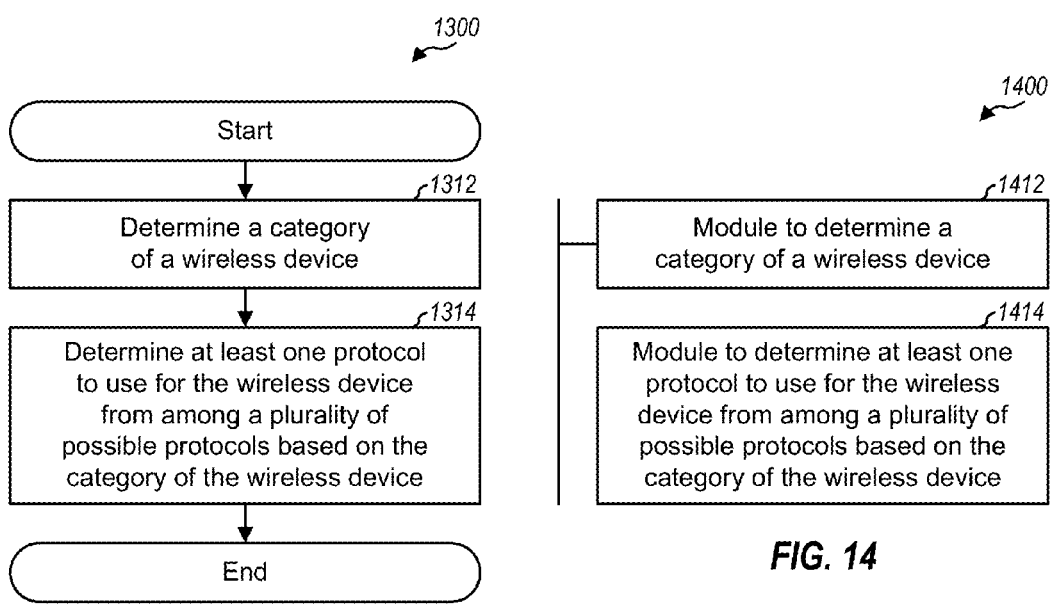

METHOD AND APPARATUS FOR TRANSMITTING CONTROL INFORMATION VIA UPPER LAYER

The present application claims priority to provisional U.S. Application Ser. No. 61/164,123, entitled "UPPER LAYER ENHANCEMENTS FOR MACHINE TO MACHINE COMMUNICATION," filed Mar. 27, 2009, assigned to the assignee hereof and incorporated herein by reference.

BACKGROUND

I. Field

The present disclosure relates generally to communication, and more specifically to techniques for supporting communication in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of wireless devices. A wireless device may be a user equipment (UE), a remote device, etc. A UE is a device that operates under direct control by humans. Some examples of UEs include cellular phones, smart phones, personal digital assistants (PDAs), wireless modems, handheld devices, laptop computers, netbooks, etc. A remote device is a device that operates without being directly controlled by humans. Some examples of remote devices include sensors, meters, location tags, etc. A remote device may communicate with a base station, another remote device, or some other entity. Machine-to-machine (M2M) communication refers to communication involving at least one remote device on at least one end of the communication.

Remote devices may have certain requirements such as low signal-to-noise ratio (SNR) operation, low power consumption, etc. It may be desirable to support operation of remote devices in light of these requirements.

SUMMARY

Techniques for supporting communication for wireless devices (e.g., remote devices) in a wireless network are described herein. The wireless network may support transmission of control information on a first physical channel having a first minimum SNR for reliable reception. Some wireless devices may require operation at a lower SNR than the first minimum SNR.

In an aspect, low SNR operation may be supported by transmitting control information for a lower layer (e.g., Layer 1 or 2) in a protocol stack via an upper layer (e.g., Layer 3) in the protocol stack. This transmission scheme may allow the control information to be transmitted on a second physical channel instead of the first physical channel normally used to transmit the control information. The second physical channel may have a second minimum SNR, which may be lower than the first minimum SNR. This transmission scheme may also allow the control information to be transmitted multiple times to improve reliability.

In one design, a first entity (e.g., a base station or a wireless device) may transmit control information for lower layer via upper layer in the protocol stack. The first entity may be able to transmit the control information via either lower layer or upper layer and may transmit the control information in different manners (e.g., on different physical channels) via lower layer and upper layer. The first entity may decide to transmit the control information via upper layer, e.g., due to the category of a wireless device transmitting or receiving the control information. The first entity may transmit or receive data via the lower layer based on the control information transmitted via the upper layer.

In another design, a second entity (e.g., a wireless device or a base station) may receive control information for lower layer via upper layer. The second entity may control data transmission via lower layer based on the control information received via upper layer. For example, the second entity may determine whether to send another transmission of a transport block based on acknowledgement/negative acknowledgement (ACK/NACK) information obtained from the control information, or determine a rate for data transmission based on channel quality indicator (CQI) information obtained from the control information, or schedule data transmission based on a scheduling request obtained from the control information, or transmit or receive data based on a grant obtained from the control information.

Various aspects and features of the disclosure are described in further detail below.

BRIEF DESCRIPTION OF THE DRAWINGS

FIG. 9 shows a process for transmitting control information.

FIG. 10 shows an apparatus for transmitting control information.

FIG. 11 shows a process for receiving control information.

FIG. 12 shows an apparatus for receiving control information.

FIG. 13 shows a process for supporting communication.

FIG. 14 shows an apparatus for supporting communication.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE.

Figure 1:
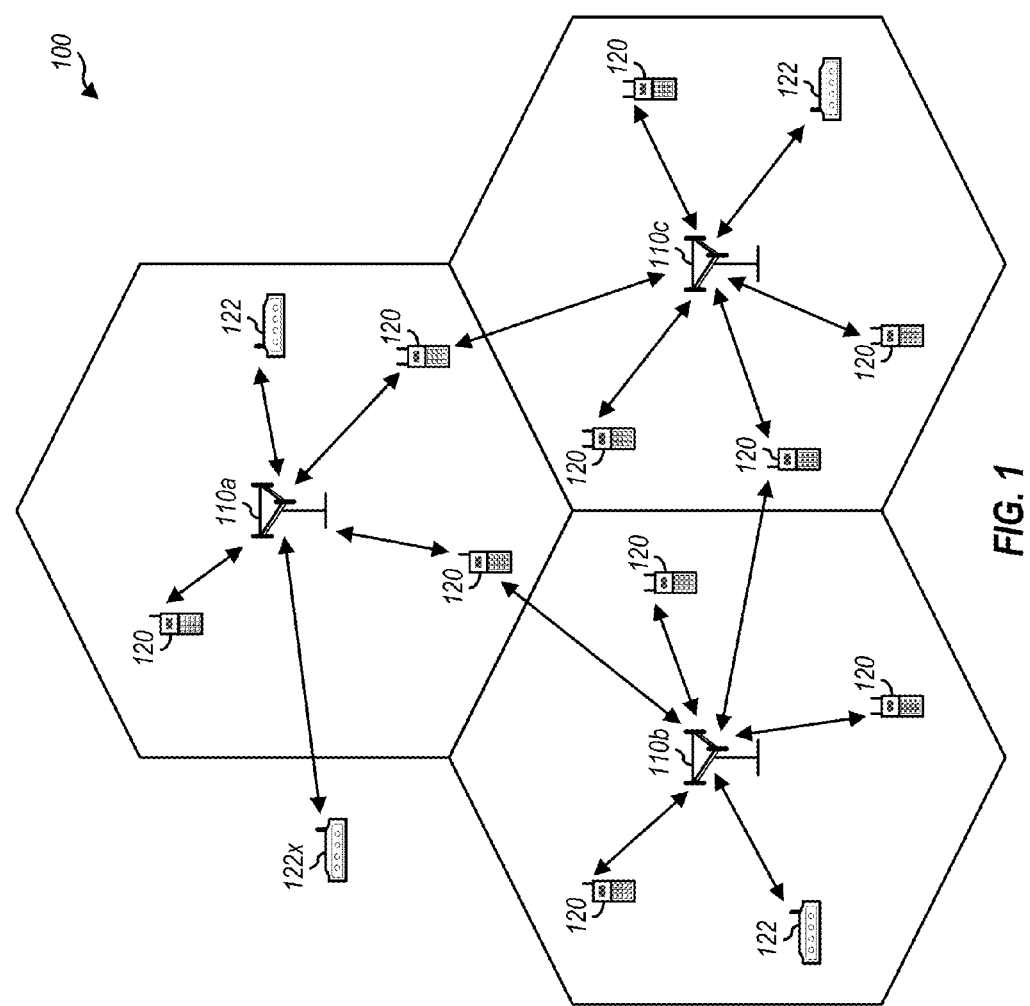
FIG. 1 shows a wireless communication network.

FIG. 1 shows a wireless communication network 100, which may be an LTE network or some other wireless network. Wireless network 100 may include a number of base stations 110 and other network entities. A base station is an entity that communicates with wireless devices and may also be referred to as a Node B, an evolved Node B (eNB), an access point, etc. Each base station 110 may provide communication coverage for a particular geographic area and may support communication for wireless devices located within the coverage area. To improve system capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area. A base station may support one or multiple (e.g., three) cells.

A number of wireless devices may be dispersed throughout the wireless network, and these wireless devices may include UEs 120, remote devices 122, etc. A UE may also be referred to as a mobile station, a terminal, an access terminal, a subscriber unit, a station, etc. A remote device may also be referred to as a machine, an unmanned device, etc. A wireless device may be stationary or mobile and may communicate with a base station via the downlink and/or uplink. The downlink (or forward link) refers to the communication link from the base station to the wireless device, and the uplink (or reverse link) refers to the communication link from the wireless device to the base station.

Figure 2A:
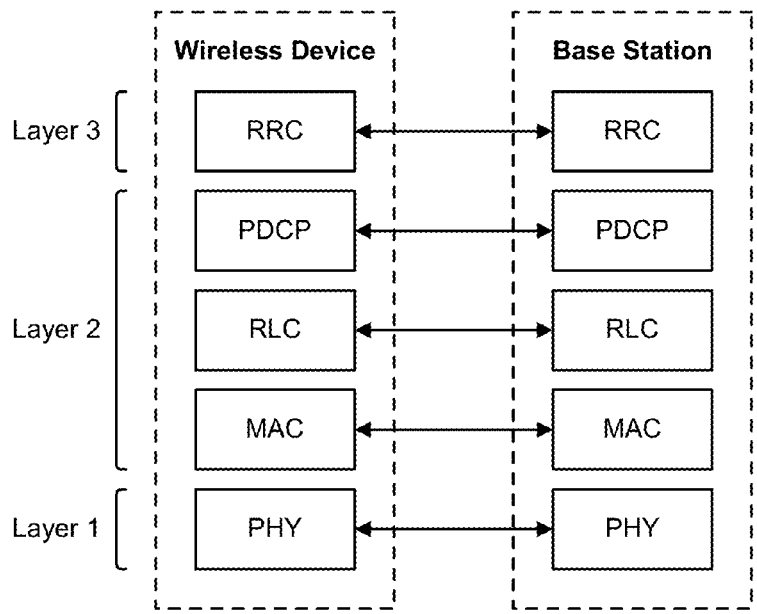
FIG. 2A shows exemplary protocol stacks for a control plane.

FIG. 2A shows exemplary protocol stacks for a control plane in LTE. The control plane carries upper layer signaling between a wireless device and a base station. As shown in FIG. 2A, the protocol stack for the wireless device includes Layers 1, 2, and 3. Layer 1 is also referred to as physical layer (PHY), and Layer 2 is also referred to as link layer. Layers 1, 2, and 3 are typically dependent on network/radio technology. For the control plane in LTE, Layer 3 includes Radio Resource Control (RRC). Layer 2 includes three sublayers for Packet Data Convergence Protocol (PDCP), Radio Link Control (RLC), and Medium Access Control (MAC). Layer 1 includes E-UTRA air-link interface. The wireless device and the base station may exchange upper layer signaling via RRC in Layer 3. The upper layer signaling may be processed by Layer 3, passed down to and processed by Layer 2, and further passed down to and processed by Layer 1 prior to transmission.

Figure 2B:
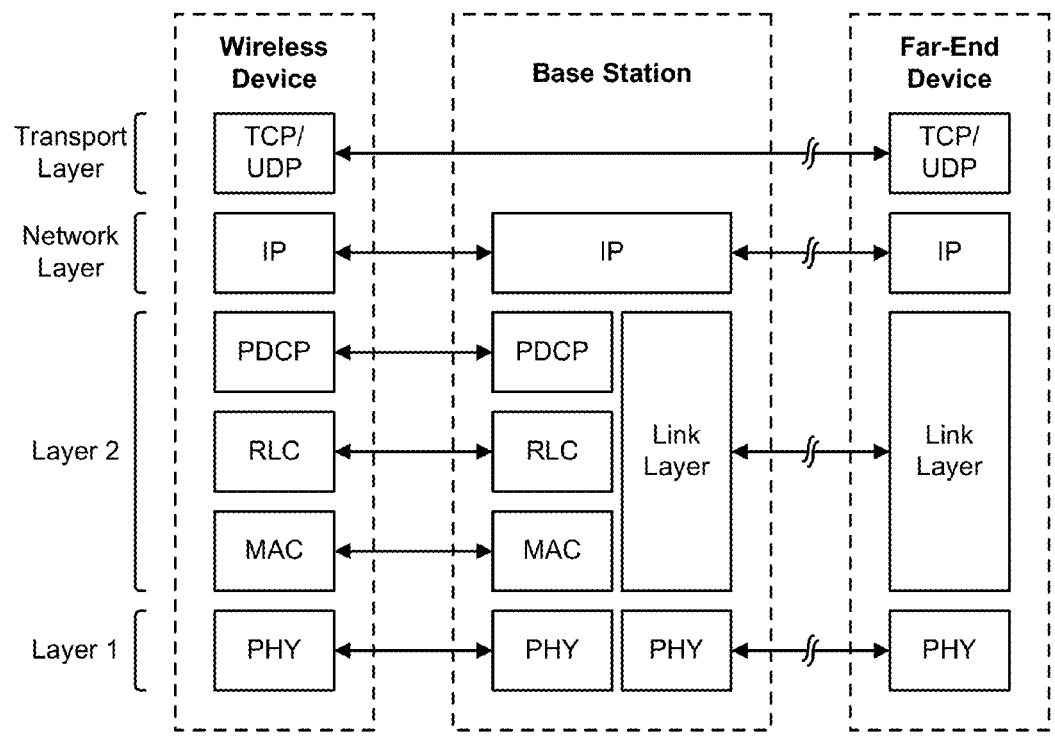
FIG. 2B shows exemplary protocol stacks for a user plane.

FIG. 2B shows exemplary protocol stacks for a user plane in LTE. The user plane carries data between a wireless device and a far-end device via a base station and other network entities. For simplicity, the other network entities are not shown in FIG. 2B. As shown in FIG. 2B, the protocol stack for the wireless device includes a transport layer, a network layer, and Layers 1 and 2. The transport layer may include Transmission Control Protocol (TCP), User Datagram Protocol (UDP), or some other protocol. The network layer may include Internet Protocol (IP). For the user plane in LTE, Layer 2 includes PDCP, RLC, and MAC, and Layer 1 includes E-UTRA. The wireless device and the far-end device may exchange application data via the user plane. The application data may be processed by TCP or UDP at the transport layer, encapsulated in IP packets at the network layer, and further processed by Layer 2 and then Layer 1 prior to transmission.

The various layers and protocols in LTE are described in 3GPP TS 36.300, entitled "Evolved Universal Terrestrial Radio Access (E-UTRA) and Evolved Universal Terrestrial Radio Access Network (E-UTRAN); Overall description; Stage 2," which is publicly available. TCP, UDP and IP are described in Request for Comments (RFC) 793, RFC 768 and RFC 791, respectively, which are publicly available.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

The time-frequency resources for each of the downlink and uplink may be partitioned into units of resource blocks. Each resource block may cover 12 subcarriers in one slot and may include a number of resource elements. Each resource element may cover one subcarrier in one symbol period and may be used to send one modulation symbol, which may be a real or complex value. On the downlink, an OFDM symbol may be transmitted in each symbol period. On the uplink, an SC-FDMA symbol may be transmitted in each symbol period. An OFDM symbol or an SC-FDMA symbol may include non-zero symbols on subcarriers used for transmission and zero symbols on subcarriers not used for transmission.

Figure 3A:
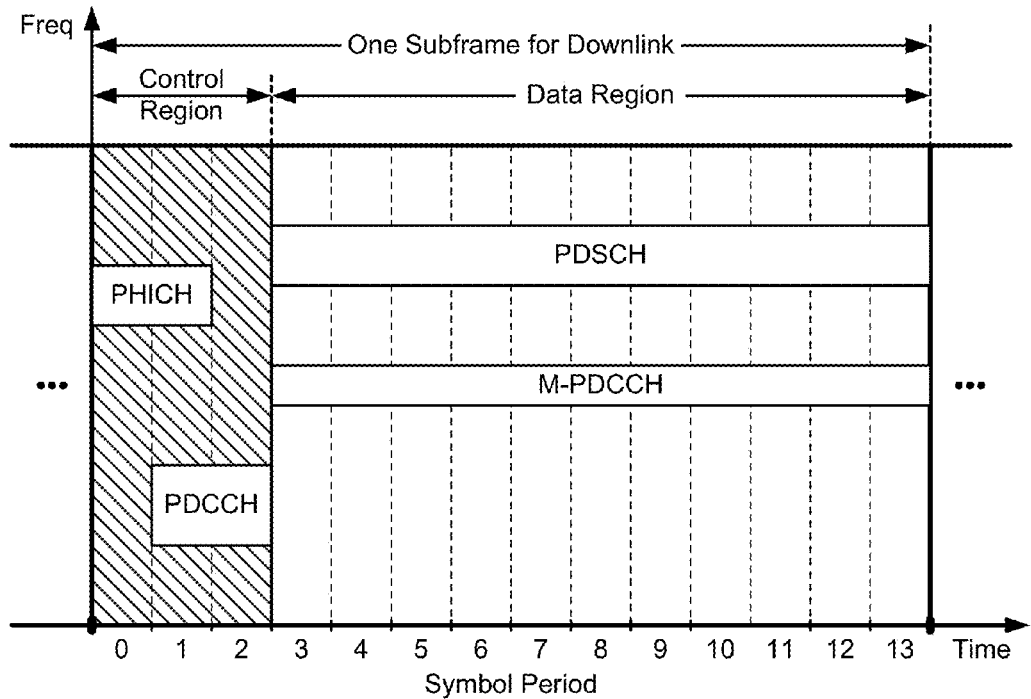
FIG. 3A shows an exemplary subframe structure for the downlink.

FIG. 3A shows a subframe structure for the downlink in LTE. The transmission timeline for the downlink may be partitioned into units of subframes. Each subframe may have a predetermined duration (e.g., 1 milliseconds (ms)) and may include two slots. Each slot may include S symbol periods, e.g., seven symbol periods for a normal cyclic prefix (as shown in FIG. 3A) or six symbol periods for an extended cyclic prefix. The 2S symbol periods in each subframe may be assigned indices of 0 through 2S-1.

A subframe for the downlink may include a control region and a data region, which are time division multiplexed. The control region may include the first Q symbol periods of the subframe, where Q may be equal to 1, 2, 3 or 4. Q may change from subframe to subframe and may be conveyed in the first symbol period of the subframe. The control region may carry control information. The data region may include the remaining 2S-Q symbol periods of the subframe and may carry data and/or other information for wireless devices.

In LTE, a base station may transmit a Physical Control Format Indicator Channel (PCFICH), a Physical Hybrid ARQ Indicator Channel (PHICH), and one or more instances of a Physical Downlink Control Channel (PDCCH) in the control region of a subframe. The PCFICH may be transmitted in the first symbol period of the subframe (not shown in FIG. 3A) and may convey the size of the control region (i.e., the number of symbol periods Q for the control region). The PHICH may carry ACK/NACK information for data transmission sent on the uplink with hybrid automatic repeat request (HARQ). Each instance of the PDCCH may be transmitted in one or more Control Channel Elements (CCEs), with each CCE including 36 resource elements. Each instance of the PDCCH may carry downlink control information (DCI) for one or more wireless devices. The DCI sent in each PDCCH may convey one or more downlink grants, one or more uplink grants, power control information, and/or other control information. A downlink grant may carry control information for data transmission on the downlink. An uplink grant may carry control information for data transmission on the uplink. A grant may be sent to a specific wireless device or a group of wireless devices and may also be referred to as an assignment. A wireless device may be configured to listen to one or more instances of the PDCCH.

The base station may transmit a Physical Downlink Shared Channel (PDSCH) in the data region of a subframe. The PDSCH may carry data for wireless devices scheduled for data transmission on the downlink.

Figure 3B:
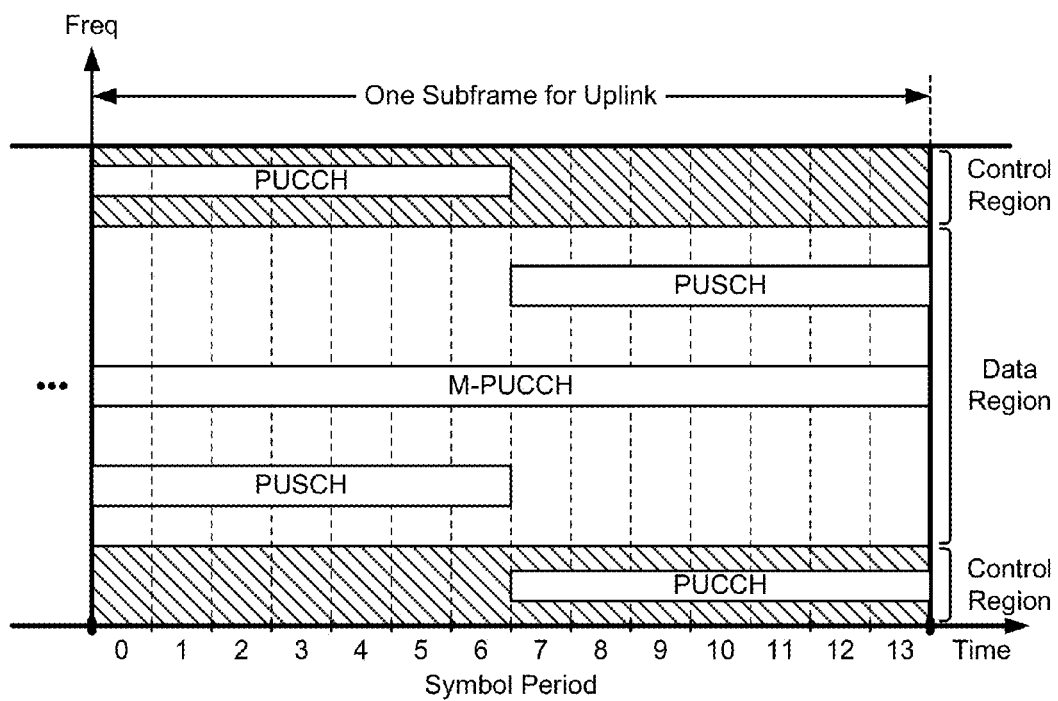
FIG. 3B shows an exemplary subframe structure for the uplink.

FIG. 3B shows a subframe structure for the uplink in LTE. A subframe for the uplink may include a control region and a data region, which are frequency division multiplexed. The control section may be formed at the two edges of the system bandwidth, as shown in FIG. 3B. The control section may have a configurable size, which may be selected based on the amount of control information being sent on the uplink by wireless devices. The data section may include all resource blocks not included in the control section.

A wireless device may transmit either a Physical Uplink Control Channel (PUCCH) in the control region or a Physical Uplink Shared Channel (PUSCH) in the data region of a subframe. The PUCCH may carry control information such as ACK/NACK information for data transmission sent on the downlink, CQI information indicative of channel quality on the downlink, a scheduling request (SR), a buffer status request (BSR), and/or other control information. The PUSCH may carry only data or both data and control information from the wireless device.

The various physical channels in LTE are described in 3GPP TS 36.211, entitled "Evolved Universal Terrestrial Radio Access (E-UTRA); Physical Channels and Modulation," which is publicly available.

The wireless network may support M2M communication for remote devices and M2M applications. These remote devices and M2M applications may be very diverse and may vary significantly in their communication requirements. For example, some remote devices such as sensors, meters, etc., (e.g., remote device 122x in FIG. 1) may be located in remote areas with limited coverage or outside the normal coverage of the wireless network. These remote devices can be supported if the wireless network can provide extended coverage. LTE and other radio technologies are typically designed for well-planned wireless networks that can offer connectivity down to a particular minimum SNR, which may be about −5 decibels (dB). A main limitation for this is the control channels. Some enhancements to the control channels may be needed in order to support operation of remote devices at lower SNR.

Some remote devices such as sensors, meters, vending machines, etc., may have low data rate requirements. Furthermore, many remote devices may (i) be stationary and have relatively static channels or (ii) have low mobility and slowly varying channels. In addition, many remote devices and M2M applications can tolerate relatively long delay for data transmission.

Many remote devices may have limited access to electric power, or it may be impractical to change battery often. For these remote devices, low power consumption and long battery life may be highly desirable.

In general, a remote device may have one or more of the following characteristics:

1. Require low SNR operation,
2. Operate at low data rate,
3. Require low power consumption, and
4. Tolerant to delay.

In an aspect, low SNR operation may be supported by transmitting control information for lower layer (e.g., Layer 1 or 2) via upper layer (e.g., Layer 3). Control information may comprise ACK/NACK information sent on the downlink or uplink, CQI information sent on the uplink, a scheduling request, a grant, etc. The CQI information may be used for link adaptation, and the ACK/NACK information may be used for reliable transmission. Control information is normally transmitted on control channels in Layer 1 to minimize transmission delay. For wireless devices (e.g., remote devices) that can tolerate longer delay and/or have static or slowly varying channels, the limitations imposed by these control channels may be overcome by transmitting control information via upper layer, as described below.

Figure 4:
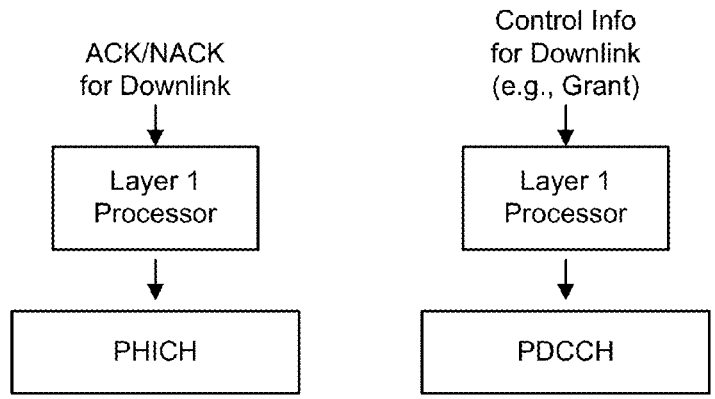
FIGS. 4 and 5 show transmission of downlink control information via Layers 1 and 3, respectively.

FIG. 4 shows transmission of control information for Layer 1 on the downlink in LTE. ACK/NACK information may be processed at Layer 1 to generate symbols, which may be transmitted on the PHICH in the control region of a downlink subframe, as shown in FIG. 3A. Control information for the downlink (e.g., one or more grants) may also be processed at Layer 1 to generate symbols, which may be transmitted on the PDCCH in the control region of a downlink subframe, as also shown in FIG. 3A.

In general, different types of control information may be transmitted on the downlink. Each type of control information may be transmitted on a specific control channel designated for that control information type. Each control channel can be reliably received at a particular minimum SNR, which may be dependent on the design of the control channel. The minimum SNR of a control channel is the lowest SNR at which the control channel can be reliably received, e.g., with a target error rate or lower. The PHICH and PDCCH may have minimum SNRs that may be sufficiently low for well-planned wireless networks but may not be low enough for low SNR operation required by some remote devices.

Figure 5:
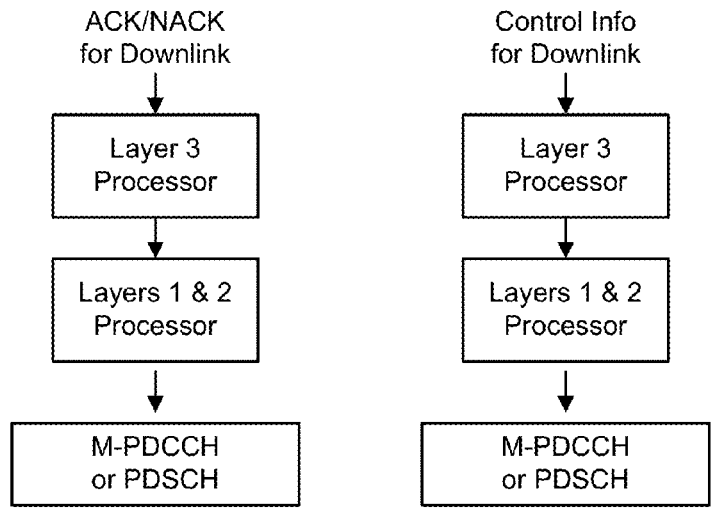

FIG. 5 shows a design of transmitting control information for Layer 1 via Layer 3 on the downlink. ACK/NACK information may be processed at Layer 3 and further processed at Layers 2 and 1 to generate symbols. These symbols may be transmitted on the PDSCH or a Machine PDCCH (M-PDCCH) in the data region of a downlink subframe, as shown in FIG. 3A. The M-PDCCH may also be referred to as a Machine PDSCH (M-PDSCH), etc. Control information for the downlink (e.g., one or more grants) may also be processed at Layer 3 and further processed at Layers 2 and 1 to generate symbols. These symbols may be transmitted on the PDSCH or M-PDCCH in the data region of a downlink subframe, as also shown in FIG. 3A.

The M-PDCCH may be a robust physical channel that can be reliably received at a lower SNR than (i) the minimum SNR of the PHICH normally used to transmit ACK/NACK information and (ii) the minimum SNR of the PDCCH normally used to transmit other control information for the downlink. A lower code rate may be used for the M-PDCCH to generate more redundancy information for the control information being transmitted. The extra redundancy information may allow the control information to be recovered at a lower SNR than the minimum SNRs of the PHICH and PDCCH. For example, the PHICH and PDCCH may support operation down to about −5 dB SNR, and the M-PDCCH may support operation down to about −10 dB, −15 dB, or some other low SNR. Since the data region includes more resource elements than the control region, more resource elements may be assigned to the M-PDCCH to carry the extra redundancy information.

As shown in FIGS. 4 and 5, an advantage of transmitting control information for Layer 1 via Layer 3 is the ability to transmit the control information on a different physical channel than the physical channel normally used to transmit the control information via Layer 1. For example, ACK/NACK information may be transmitted on the PDSCH or M-PDCCH via Layer 3 instead of the PHICH via Layer 1. Similarly, other control information may be transmitted on the PDSCH or M-PDCCH via Layer 3 instead of the PDCCH via Layer 1. The PDSCH and/or M-PDCCH may support reliable operation at a lower SNR than the PHICH and PDCCH. Longer delay may be incurred by transmitting the control information via Layer 3. However, the longer delay may be acceptable, e.g., due to lower data rate and low mobility of many remote devices.

Figures 6, 7:
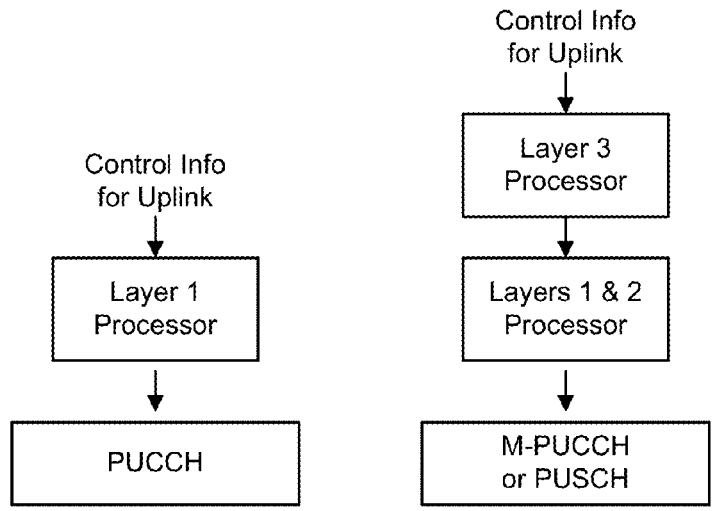
FIGS. 6 and 7 show transmission of uplink control information via Layers 1 and 3, respectively.

FIG. 6 shows transmission of control information for Layer 1 on the uplink in LTE. Control information for the uplink (e.g., ACK/NACK information, CQI information, scheduling request, etc.) may be processed at Layer 1 to generate symbols, which may be transmitted on the PUCCH in the control region of an uplink subframe, as shown in FIG. 3B. The PUCCH may have a minimum SNR that may be sufficiently low for well-planned wireless networks but may not be low enough for low SNR operation required by some remote devices.

FIG. 7 shows a design of transmitting control information for Layer 1 via Layer 3 on the uplink. Control information for the uplink may be processed at Layer 3 and further processed at Layers 2 and 1 to generate symbols. These symbols may be transmitted on the PUSCH or a Machine PUCCH (M-PUCCH) in the data region of an uplink subframe, as shown in FIG. 3B. The M-PUCCH may also be referred to as a Machine PUSCH (M-PUSCH), etc. The M-PUCCH may be a robust physical channel that can be reliably received at a lower SNR than the minimum SNR of the PUCCH normally used to transmit control information for the uplink. A lower code rate may be used for the M-PUCCH to obtain more redundancy in order to support low SNR operation.

In another aspect, low SNR operation may be supported by transmitting control information in multiple instances of a physical channel (e.g., the PDCCH, PDSCH, M-PDCCH, PUCCH, PUSCH or M-PUCCH) with aggregation. Conventionally, a single transmission of control information may be sent in a single instance of the PHICH, PDCCH or PUCCH. To support low SNR operation, multiple transmissions of control information may be sent in multiple instances of the PDCCH, PDSCH, M-PDCCH, PUCCH, PUSCH or M-PUCCH. This would allow more redundancy information to be sent for the control information, which may enable reliable reception of the control information at a lower SNR. The multiple instances of the physical channel may be transmitted in the same subframe or different subframes.

Figure 8:
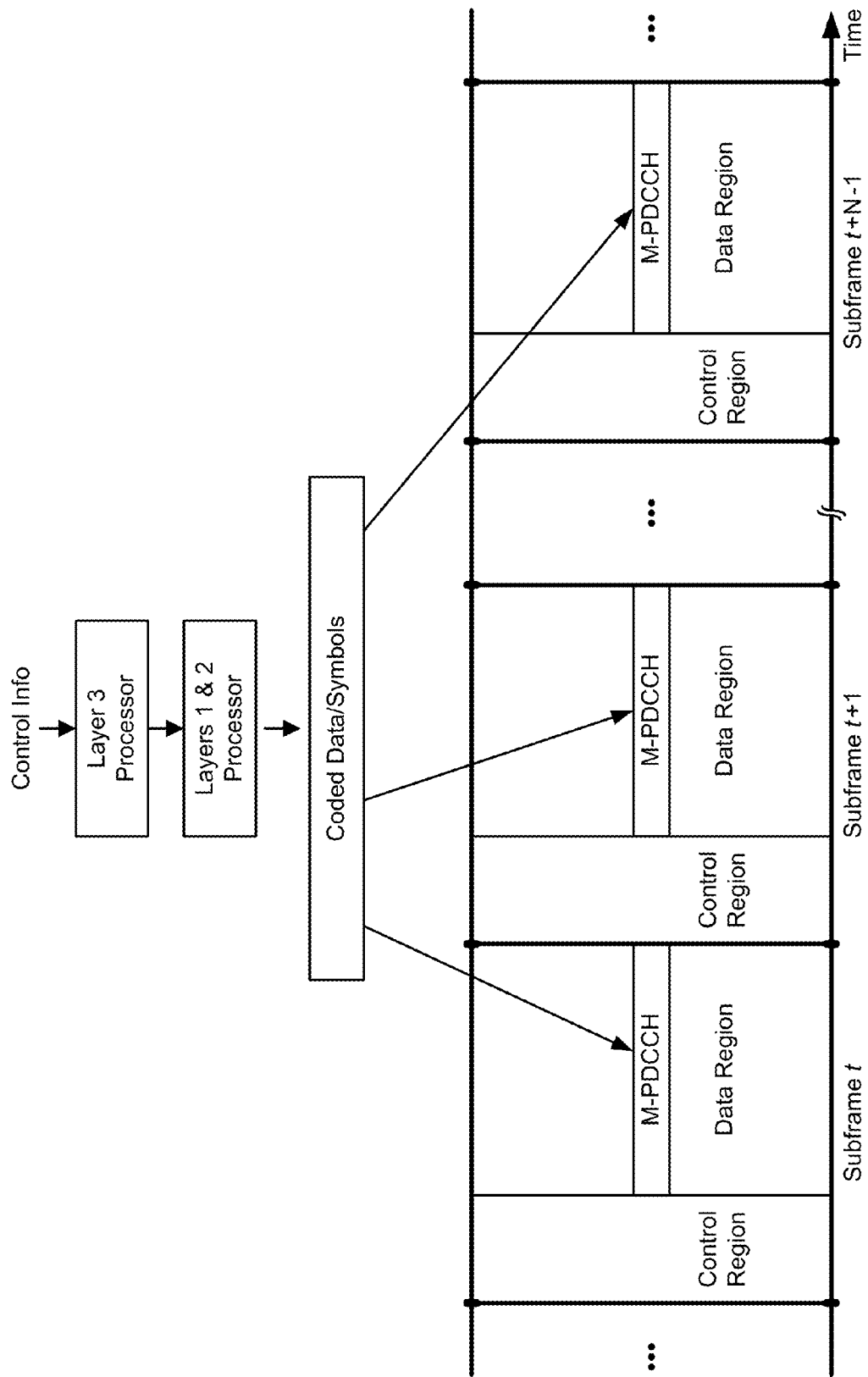
FIG. 8 shows transmission of control information in multiple instances.

FIG. 8 shows a design of transmitting control information for the downlink in multiple instances of the M-PDCCH with aggregation. Control information for the downlink may be processed at Layer 3 and further processed at Layers 2 and 1 to generate symbols. The symbols may be transmitted on the PDSCH or M-PDCCH in the data region of subframe t. The control information may be processed again at Layer 3 and further processed at Layers 2 and 1 to generate symbols, which may be transmitted on the PDSCH or M-PDCCH in the data region of the next subframe t+1. Processing and transmission of the control information may be repeated, and the control information may be transmitted in N instances of the PDSCH or M-PDCCH in one or multiple subframes, where N may be any value.

As shown in FIG. 8, another advantage of transmitting control information for Layer 1 via Layer 3 is the ability to transmit the control information in multiple instances of a physical channel. In one design that is shown in FIG. 8, the same control information may be passed through Layers 3, 2 and 1 for each of the multiple instances of the physical channel. The control information would then be processed based on repetition coding. In another design, the control information may be processed (e.g., encoded and symbol mapped) to obtain a sufficient number of symbols for all N instances of the physical channel. A different set of symbols may be transmitted in each instance of the physical channel. The control information would then be processed based on joint coding.

Control information may be sent via Layer 3 in various manners. In one design, control information may be treated in similar manner as data, may be processed by Layers 3, 2 and 1 like data, and may be sent on the PDSCH or PUSCH like data. In this design, different message formats and/or fields may be used to distinguish control information and data. This design may allow control information to be multiplexed with data via Layer 3 and transmitted like data via Layers 1 and 2 on the same physical channel used for data. In another design, control information may be treated differently from data, may be processed by Layers 3, 2 and 1 in a specific manner defined for control information, and may be sent on the PDCCH, PDSCH, M-PDCCH, PUCCH, PUSCH or M-PUCCH. This design may allow control information to be processed in any suitable manner and transmitted on any suitable physical channel without regards to the processing and physical channels used for data.

As noted above, some remote devices may need to operate with low power consumption. Some protocols may support many functionalities and may have a large overhead. For example, TCP can provide reliable in-order delivery of data and can also perform flow control by varying a TCP window size. However, TCP has a large overhead that may shorten battery life. Furthermore, many M2M applications may not need the functionalities provided by TCP.

In yet another aspect, a suitable set of one or more protocols may be selected for a wireless device (e.g., a remote device) based on a category and/or other characteristics of the wireless device. A set of categories may be supported and may be defined for wireless devices based on various factors such as quality-of-service (QoS) requirements, SNR requirements, etc. QoS requirements may be given by delay requirements (or amount of delay that can be tolerated), error rate requirements, traffic class (e.g., best effort or guaranteed delivery), etc. SNR requirements may be given by the lowest SNR at which reliable operation is required. A set of one or more protocols may be defined for each category of wireless devices. An appropriate set of protocol(s) may be used for a wireless device based on its category.

In one design, UDP may be used for some categories of wireless devices (e.g., some remote devices) having lower constraints on reliability and delay. UDP can provide best effort delivery of data and may be suitable for streaming data and other applications that do not need reliable delivery of data. TCP may be used for some other categories of wireless devices having more stringent constraints on reliability and delay.

In another design, data compression may be used for one or more categories of wireless devices (e.g., some remote devices) that are likely to generate data that is correlated. Data compression may exploit the correlation in order to reduce the amount of data to send. Data compression may be omitted for some other categories of wireless devices.

Other optimizations may also be performed by taking into account the applications and requirements of wireless devices. These optimizations may bring improvements in terms of performance and power savings.

The techniques described herein may enable operation in lower SNR and possibly with lower power consumption. The techniques may allow a wireless network to support remote devices and M2M applications. The wireless network can provide wireless wide area network (WWAN) communication coverage for the remote devices based on the techniques described herein.

FIG. 9 shows a design of a process 900 for transmitting control information in a wireless network. Process 900 may be performed by a base station, or a wireless device, or some other entity. Control information for a lower layer in a protocol stack may be obtained (block 912). The control information may comprise ACK/NACK information, CQI information, a scheduling request, a grant, some other information, or a combination thereof. The control information may be transmitted via an upper layer in the protocol stack (block 914). In one design, the lower layer may correspond to physical layer or link layer, and the upper layer may correspond to Layer 3. The lower layer and upper layer may also correspond to other layers in the protocol stack. Data may be transmitted or received via the lower layer based on the control information transmitted via the upper layer (block 916).

In one design, the control information can be transmitted via either the lower layer or the upper layer based on the category of a wireless device transmitting or receiving the control information. The control information may be transmitted in different manners via the lower layer and upper layer. The control information may be sent on a first physical channel (e.g., the PHICH, PDCCH or PUCCH) if transmitted via the lower layer and may be sent on a second physical channel (e.g., the PDSCH, M-PDCCH, PUSCH or M-PUCCH) if transmitted via the upper layer. The first physical channel may have a first minimum SNR, and the second physical channel may have a second minimum SNR, which may be lower than the first minimum SNR. The first physical channel may be sent in a first region (e.g., a control region) of a subframe, and the second physical channel may be sent in a second region (e.g., a data region) of the subframe. The control information may be sent (i) in a single instance of the first physical channel if transmitted via the lower layer or (ii) in one or more instances of the second physical channel if transmitted via the upper layer.

In one design, a base station may transmit the control information (e.g., a downlink grant) on the downlink to control data transmission on the downlink to a wireless device. In another design, the base station may transmit the control information (e.g., ACK/NACK information or an uplink grant) on the downlink to control data transmission on the uplink by the wireless device. In yet another design, the wireless device may transmit the control information (e.g., ACK/NACK information, CQI information, etc.) on the uplink to control data transmission on the downlink by the base station. The wireless device may be a UE operating with direct human control or a remote device operating without direct human control.

FIG. 10 shows a design of an apparatus 1000 for transmitting control information in a wireless network. Apparatus 1000 includes a module 1012 to obtain control information for a lower layer in a protocol stack, a module 1014 to transmit the control information via an upper layer in the protocol stack, and a module 1016 to transmit or receive data via the lower layer based on the control information transmitted via the upper layer.

FIG. 11 shows a design of a process 1100 for receiving control information in a wireless network. Process 1100 may be performed by a base station, or a wireless device, or some other entity. Control information for a lower layer of a protocol stack may be received via an upper layer of the protocol stack (block 1112). The control information may be transmitted via either the lower layer or the upper layer. The control information may be received in different manners depending on whether it was transmitted via the lower layer or upper layer. For example, the control information may be received on a first physical channel if transmitted via the lower layer or on a second physical channel if transmitted via the upper layer.

Data transmission via the lower layer may be controlled based on the control information received via the upper layer (block 1114). In one design, whether to send another transmission of a transport block may be determined based on ACK/NACK information obtained from the control information. In another design, a rate for data transmission via the lower layer may be determined based on CQI information obtained from the control information. In yet another design, data transmission via the lower layer may be scheduled based on a scheduling request obtained from the control information. In yet another design, data transmission via the lower layer may be sent or received based on a grant obtained from the control information.

FIG. 12 shows a design of an apparatus 1200 for receiving control information in a wireless network. Apparatus 1200 includes a module 1212 to receive control information for a lower layer of a protocol stack via an upper layer of the protocol stack, and a module 1214 to control data transmission via the lower layer based on the control information received via the upper layer.

FIG. 13 shows a design of a process 1300 for supporting communication. Process 1300 may be performed by a base station, or a wireless device, or some other entity. A category of a wireless device may be determined (block 1312). At least one protocol to use for the wireless device may be determined from among a plurality of possible protocols based on the category of the wireless device (block 1314). In one design, a plurality of categories of wireless devices may be supported. Each category may be associated with a respective set of at least one protocol to use for wireless devices in that category. In one design, the category of the wireless device may be associated with relaxed reliability and delay requirements, and the at least one protocol may comprise UDP. In another design, the category of the wireless device may be associated with more stringent reliability and delay requirements, and the at least one protocol may comprise TCP. Other operating features may also be determined based on the category of the wireless device. For example, whether or not to use data compression for the wireless device may be determined based on the category of the wireless device.

FIG. 14 shows a design of an apparatus 1400 for supporting communication. Apparatus 1400 includes a module 1412 to determine a category of a wireless device, and a module 1414 to determine at least one protocol to use for the wireless device from among a plurality of possible protocols based on the category of the wireless device.

The modules in FIGS. 10, 12 and 14 may comprise processors, electronic devices, hardware devices, electronic components, logical circuits, memories, software codes, firmware codes, etc., or any combination thereof.

Figure 15:
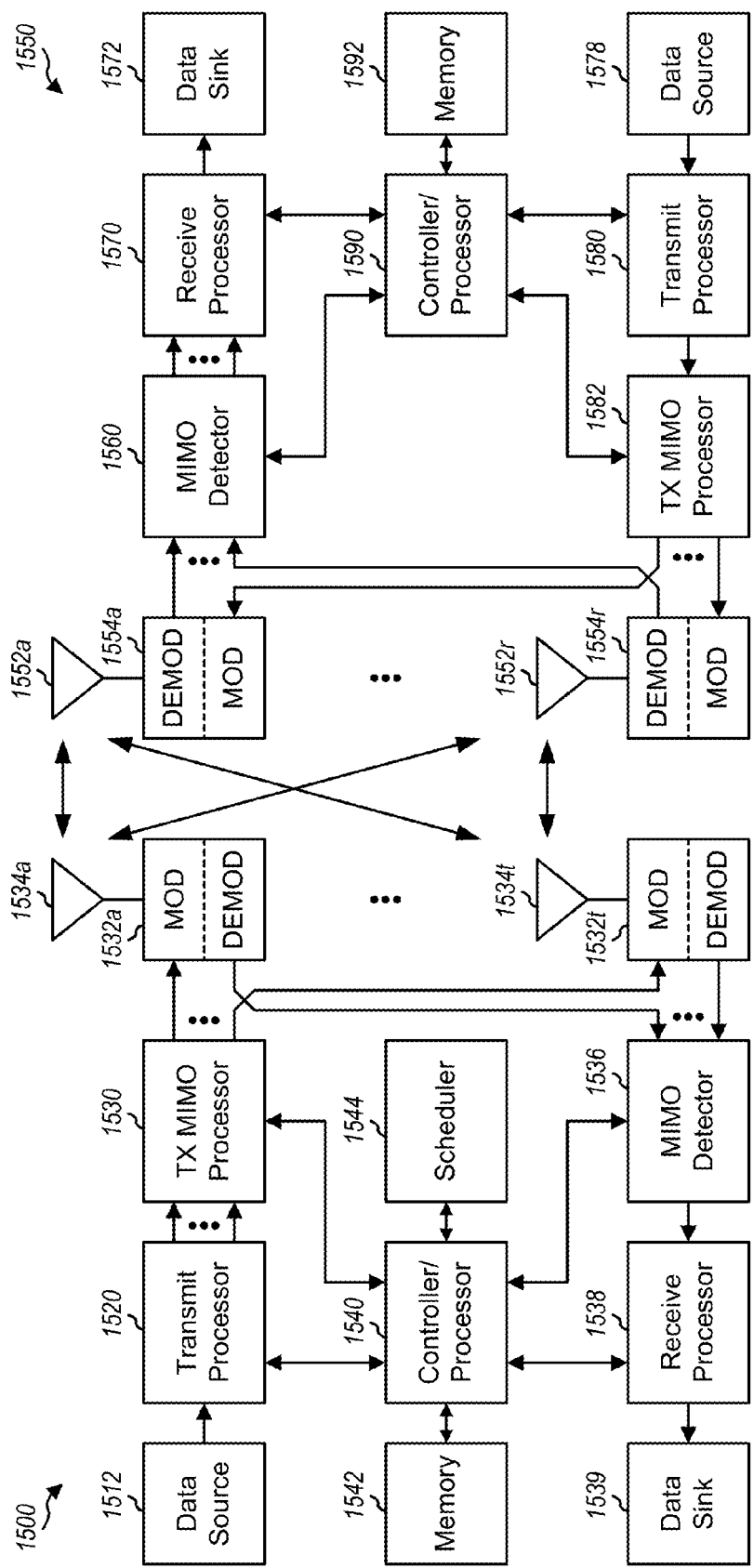
FIG. 15 shows a block diagram of a base station and a wireless device.

FIG. 15 shows a block diagram of a design of a base station 1500 and a wireless device 1550, which may be one of the base stations and one of the wireless devices in FIG. 1. Base station 1500 may be equipped with T antennas 1534a through 1534t, and wireless device 1550 may be equipped with R antennas 1552a through 1552r, where in general T≥1 and R≥1.

At base station 1500, a transmit processor 1520 may receive data from a data source 1512 for one or more wireless devices, process (e.g., encode and modulate) the data for each wireless device based on one or more modulation and coding schemes selected for that wireless device, and provide data symbols for all wireless devices. Transmit processor 1520 may also process control information (e.g., for the PCFICH, PHICH, PDCCH, M-PDCCH, etc.) and provide control symbols. Transmit processor 1520 may also generate reference symbols. A transmit (TX) multiple-input multiple-output (MIMO) processor 1530 may precode the data symbols, the control symbols, and/or the reference symbols (if applicable) and may provide T output symbol streams to T modulators (MOD) 1532a through 1532t. Each modulator 1532 may process its output symbol stream (e.g., for OFDM, etc.) to obtain an output sample stream. Each modulator 1532 may further condition (e.g., convert to analog, filter, amplify, and upconvert) its output sample stream and generate a downlink signal. T downlink signals from modulators 1532a through 1532t may be transmitted via T antennas 1534a through 1534t, respectively.

At wireless device 1550, R antennas 1552a through 1552r may receive the T downlink signals from base station 1500, and each antenna 1552 may provide a received signal to an associated demodulator (DEMOD) 1554. Each demodulator 1554 may condition (e.g., filter, amplify, downconvert, and digitize) its received signal to obtain samples and may further process the samples (e.g., for OFDM, etc.) to obtain received symbols. A MIMO detector 1560 may perform MIMO detection on the received symbols (if applicable) and provide detected symbols. A receive processor 1570 may process (e.g., demodulate and decode) the detected symbols to obtain decoded data and control information for wireless device 1550. Processor 1570 may provide the decoded data to a data sink 1572 and provide the decoded control information to a controller/processor 1590.

On the uplink, data from a data source 1578 and control information from controller/processor 1590 may be processed (e.g., encoded and modulated) by a transmit processor 1580, spatially processed by a TX MIMO processor 1582 (if applicable), and further processed by modulators 1554a through 1554r to generate R uplink signals, which may be transmitted via antennas 1552a through 1552r. At base station 1500, the R uplink signals from wireless device 1550 may be received by antennas 1534a through 1534t, processed by demodulators 1532a through 1532t, detected by a MIMO detector 1536 (if applicable), and further processed (e.g., demodulated and decoded) by a receive processor 1538 to recover the data and control information transmitted by wireless device 1550. Controller/processor 1540 may control data transmission to/from wireless device 1550 based on the control information received from wireless device 1550. Processor 1540 may provide the recovered data to a data sink 1539.

Controllers/processors 1540 and 1590 may direct the operation at base station 1500 and wireless device 1550, respectively. Processor 1540 and/or other processors and modules at base station 1500 may perform or direct process 900 in FIG. 9, process 1100 in FIG. 11, process 1300 in FIG. 13, and/or other processes for the techniques described herein. Processor 1590 and/or other processors and modules at wireless device 1550 may also perform or direct process 900, process 1100, process 1300, and/or other processes for the techniques described herein. Memories 1542 and 1592 may store data and program codes for base station 1500 and wireless device 1550, respectively. A scheduler 1544 may schedule wireless device 1550 and/or other wireless devices for data transmission on the downlink and/or uplink based on the control information received from all wireless devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   obtaining control information for a lower layer in a protocol stack;
   determining whether to transmit the control information via the lower layer or an upper layer in the protocol stack based on a category of a wireless device transmitting or receiving the control information; and
   transmitting the control information via the upper layer in the protocol stack in response to a determination to transmit the control information via the upper layer,
   wherein the control information is sent on a first physical channel if transmitted via the lower layer and is sent on a second physical channel if transmitted via the upper layer, and wherein the first physical channel has a first minimum signal-to-noise ratio and the second physical channel has a second minimum signal-to-noise ratio that is lower than the first minimum signal-to-noise ratio.

2. The method of claim 1, wherein the lower layer corresponds to physical layer or link layer, and wherein the upper layer corresponds to Layer 3.

3. The method of claim 1, wherein the category of the wireless device is determined based at least on a signal-to-noise ratio requirement of the wireless device.

4. The method of claim 1, wherein the first physical channel is sent in a first region of a subframe and the second physical channel is sent in a second region of the subframe.

5. The method of claim 1, wherein the control information is sent in a single instance of the first physical channel if transmitted via the lower layer and is sent in one or more instances of the second physical channel if transmitted via the upper layer.

6. The method of claim 1, wherein the control information comprises acknowledgement/negative acknowledgement information, or channel quality indicator information, or a scheduling request, or a grant, or a combination thereof.

7. The method of claim 1, further comprising:
   transmitting or receiving data via the lower layer based on the control information transmitted via the upper layer.

8. The method of claim 1, wherein the control information is transmitted by a base station on downlink to control data transmission on the downlink to the wireless device or to control data transmission on uplink by the wireless device.

9. The method of claim 1, wherein the control information is transmitted by the wireless device on uplink to control data transmission on downlink by a base station.

10. An apparatus for wireless communication, comprising:
    means for obtaining control information for a lower layer in a protocol stack;
    means for determining whether to transmit the control information via the lower layer or an upper layer in the protocol stack based on a category of a wireless device transmitting or receiving the control information; and
    means for transmitting the control information via the upper layer in the protocol stack in response to a determination to transmit the control information via the upper layer,
    wherein the control information is sent on a first physical channel if transmitted via the lower layer and is sent on a second physical channel if transmitted via the upper layer, and wherein the first physical channel has a first minimum signal-to-noise ratio and the second physical channel has a second minimum signal-to-noise ratio that is lower than the first minimum signal-to-noise ratio.

11. The apparatus of claim 10, wherein the category of the wireless device is determined based at least on a signal-to-noise ratio requirement of the wireless device.

12. The apparatus of claim 10, wherein the first physical channel is sent in a first region of a subframe and the second physical channel is sent in a second region of the subframe.

13. The apparatus of claim 10, wherein the control information is sent in a single instance of the first physical channel if transmitted via the lower layer and is sent in one or more instances of the second physical channel if transmitted via the upper layer.

14. An apparatus for wireless communication, comprising:
    at least one processor configured to:
      obtain control information for a lower layer in a protocol stack,
      determine whether to transmit the control information via the lower layer or an upper layer in the protocol stack based on a category of a wireless device transmitting or receiving the control information, and transmit the control information via the upper layer in the protocol stack in response to a determination to transmit the control information via the upper layer,
wherein the control information is sent on a first physical channel if transmitted via the lower layer and is sent on a second physical channel if transmitted via the upper layer, and wherein the first physical channel has a first minimum signal-to-noise ratio and the second physical channel has a second minimum signal-to-noise ratio that is lower than the first minimum signal-to-noise ratio.

15. A computer program product, comprising:
a non-transitory computer-readable medium comprising:
code for causing at least one computer to obtain control information for a lower layer in a protocol stack,
code for causing the at least one computer to determine whether to transmit the control information via the lower layer or an upper layer in the protocol stack based on a category of a wireless device transmitting or receiving the control information; and
code for causing the at least one computer to transmit the control information via the upper layer in the protocol stack in response to a determination to transmit the control information via the upper layer,
wherein the control information is sent on a first physical channel if transmitted via the lower layer and is sent on a second physical channel if transmitted via the upper layer, and wherein the first physical channel has a first minimum signal-to-noise ratio and the second physical channel has a second minimum signal-to-noise ratio that is lower than the first minimum signal-to-noise ratio.

16. A method for wireless communication, comprising:
receiving control information for a lower layer of a protocol stack via an upper layer of the protocol stack, wherein the control information is received on a first physical channel if transmitted via the lower layer and is received on a second physical channel if transmitted via the upper layer, and wherein the first physical channel has a first minimum signal-to-noise ratio and the second physical channel has a second minimum signal-to-noise ratio that is lower than the first minimum signal-to-noise ratio; and
controlling data transmission via the lower layer based on the control information received via the upper layer.

17. The method of claim 16, wherein the controlling data transmission comprises determining whether to send another transmission of a transport block based on acknowledgement/negative acknowledgement information obtained from the control information.

18. The method of claim 16, wherein the controlling data transmission comprises determining a rate for data transmission via the lower layer based on channel quality indicator information obtained from the control information.

19. The method of claim 16, wherein the controlling data transmission comprises scheduling data transmission via the lower layer based on a scheduling request obtained from the control information.

20. The method of claim 16, wherein the controlling data transmission comprises transmitting or receiving data via the lower layer based on a grant obtained from the control information.

21. The method of claim 16, wherein the control information is received in a first region of a subframe if transmitted via the lower layer and is received in a second region of the subframe if transmitted via the upper layer.

22. An apparatus for wireless communication, comprising:
means for receiving control information for a lower layer of a protocol stack via an upper layer of the protocol stack, wherein the control information is received on a first physical channel if transmitted via the lower layer and is received on a second physical channel if transmitted via the upper layer, and wherein the first physical channel has a first minimum signal-to-noise ratio and the second physical channel has a second minimum signal-to-noise ratio that is lower than the first minimum signal-to-noise ratio; and
means for controlling data transmission via the lower layer based on the control information received via the upper layer.

23. The apparatus of claim 22, wherein the means for controlling data transmission comprises means for determining whether to send another transmission of a transport block based on acknowledgement/negative acknowledgement information obtained from the control information.

24. The apparatus of claim 22, wherein the means for controlling data transmission comprises means for determining a rate for data transmission via the lower layer based on channel quality indicator information obtained from the control information.

25. The apparatus of claim 22, wherein the means for controlling data transmission comprises means for scheduling data transmission via the lower layer based on a scheduling request obtained from the control information.

26. An apparatus for wireless communication, comprising:
at least one processor configured to receive control information for a lower layer of a protocol stack via an upper layer of the protocol stack, and to control data transmission via the lower layer based on the control information received via the upper layer, wherein the control information is received on a first physical channel if transmitted via the lower layer and is received on a second physical channel if transmitted via the upper layer, and wherein the first physical channel has a first minimum signal-to-noise ratio and the second physical channel has a second minimum signal-to-noise ratio that is lower than the first minimum signal-to-noise ratio.

27. A computer program product, comprising:
a non-transitory computer-readable medium comprising:
code for causing at least one computer to receive control information for a lower layer of a protocol stack via an upper layer of the protocol stack, wherein the control information is received on a first physical channel if transmitted via the lower layer and is received on a second physical channel if transmitted via the upper layer, and wherein the first physical channel has a first minimum signal-to-noise ratio and the second physical channel has a second minimum signal-to-noise ratio that is lower than the first minimum signal-to-noise ratio, and
code for causing the at least one computer to control data transmission via the lower layer based on the control information received via the upper layer.

28. A method implemented in an apparatus for wireless communication, comprising:
determining, via the apparatus, a category of a wireless device based at least on a signal-to-noise ratio requirement of the wireless device, wherein the category of the wireless device is one of a plurality of categories associated with a plurality of signal-to-noise ratio requirements, and wherein each category of the plurality of categories is associated with a respective set of at least one protocol to use for wireless devices in said each category;

determining, via the apparatus, a plurality of possible protocols available for a protocol stack of the wireless device; and determining, via the apparatus, at least one protocol to use for the wireless device, from among the plurality of possible protocols available for the protocol stack of the wireless device, based on the category of the wireless device.

29. The method of claim 28, wherein the category of the wireless device is associated with relaxed reliability and delay requirements, and wherein the at least one protocol comprises User Datagram Protocol.

30. The method of claim 28, wherein the category of the wireless device is associated with more stringent reliability and delay requirements, and wherein the at least one protocol comprises Transmission Control Protocol.

31. The method of claim 28, further comprising:
determining whether to use data compression for the wireless device based on the category of the wireless device.

32. An apparatus for wireless communication, comprising:
means for determining a category of a wireless device based at least on a signal-to-noise ratio requirement of the wireless device, wherein the category of the wireless device is one of a plurality of categories associated with a plurality of signal-to-noise ratio requirements, and wherein each category of the plurality of categories is associated with a respective set of at least one protocol to use for wireless devices in said each category;

means for determining a plurality of possible protocols available for a protocol stack of the wireless device; and means for determining at least one protocol to use for the wireless device, from among the plurality of possible protocols available for the protocol stack of the wireless device, based on the category of the wireless device.

33. The apparatus of claim 32, wherein the at least one protocol comprises User Datagram Protocol if the category of the wireless device is associated with relaxed reliability and delay requirements and comprises Transmission Control Protocol if the category of the wireless device is associated with more stringent reliability and delay requirements.

34. The apparatus of claim 32, further comprising:
means for determining whether to use data compression for the wireless device based on the category of the wireless device.

35. An apparatus for wireless communication, comprising:
at least one processor configured to:
determine a category of a wireless device based at least on a signal-to-noise ratio requirement of the wireless device, wherein the category of the wireless device is one of a plurality of categories associated with a plurality of signal-to-noise ratio requirements, and wherein each category of the plurality of categories is associated with a respective set of at least one protocol to use for wireless devices in said each category, determine a plurality of possible protocols available for a protocol stack of the wireless device, and determine at least one protocol to use for the wireless device, from among the plurality of possible protocols available for the protocol stack of the wireless device, based on the category of the wireless device.

36. A computer program product, comprising:
a non-transitory computer-readable medium comprising:
code for causing at least one computer to determine a category of a wireless device based at least on a signal-to-noise ratio requirement of the wireless device, wherein the category of the wireless device is one of a plurality of categories associated with a plurality of signal-to-noise ratio requirements, and wherein each category of the plurality of categories is associated with a respective set of at least one protocol to use for wireless devices in said each category, code for causing the at least one computer to determine a plurality of possible protocols available for a protocol stack of the wireless device, and code for causing the at least one computer to determine at least one protocol to use for the wireless device, from among the plurality of possible protocols available for the protocol stack of the wireless device, based on the category of the wireless device.

* * * * *